March 14, 1950 T. MILLER 2,500,850
TRACER
Filed July 28, 1944 3 Sheets-Sheet 2

INVENTOR.
THEODORE MILLER
BY
Peck & Peck
ATTORNEYS

March 14, 1950 T. MILLER 2,500,850
TRACER
Filed July 28, 1944 3 Sheets-Sheet 3

INVENTOR.
THEODORE MILLER
BY Peck + Peck
ATTORNEYS

Patented Mar. 14, 1950

2,500,850

UNITED STATES PATENT OFFICE 2,500,850

TRACER

Theodore Miller, Racine, Wis., assignor to George Gorton Machine Co., Racine, Wis., a corporation of Wisconsin Application July 28, 1944, Serial No. 547,081

13 Claims. (Cl. 90—62)

This invention relates to improvements in motion translating devices or tracers, especially those forming a part of a control system for machine tools.

Tracers in order to be effective under present requirements of close tolerances in machine shop practice must be very accurate and sensitive. They must also be able to work with a variety of tracing styli of varying lengths. When the tracer finger is suspended for oscillation about a fixed fulcrum or has a longitudinal movement resulting from lateral deflection of the tracer finger, it cannot be utilized with a variety of styli of varying lengths without extensive and lengthy adjustments of the mechanism to compensate for such differences.

One of the objects of the invention is to provide a tracer which is very accurate and sensitive and has rapid response to minute changes in the depth and contour of the pattern, even under circumstances requiring the selective use of tracer fingers of varying shapes and sizes and lengths depending upon the type of cutting tool used.

Another object of the invention is to provide a tracer which simultaneously controls both two and three dimensional movements of the machine tool.

A still further object is to provide a tracer which is less susceptible to deflections caused by vibrations of the machine tool and the inherent inertia of its own parts and which will be deflected by slight operating pressures.

The foregoing objects are obtained: first, by suspending the tracer finger so that it may have lateral rectilinear movement independently of any longitudinal movement, as well as longitudinal movement independently of any lateral movement; in other words, the tracer finger is so suspended that its pattern contacting end may be moved laterally while still remaining in a given plane; second, by controlling the tracer so that during all of its movements the longitudinal axis of the tracer finger is maintained perpendicular to a given plane; third, by providing means which will restore the tracer finger after deflection to its zero or normal position accurately and quickly; and fourth, by elminating any co-sliding elements, or elements which have relatively moving surfaces in contact and the consequent friction. Such movement eliminates the inaccuracies occurring when a fulcrumed or oscillating tracer finger is utilized. Since all motions are rectilinear instead of angular or rotative, the ratio between the movement of that portion of tracer finger which contacts the pattern and that portion which effects operation of the sensing device is one to one. Thus tracer fingers of varying lengths and sizes can be used without causing differences in the timing of and amount of movement of the elements of the sensing devices. To obtain such independent lateral and longitudinal movement of the tracer finger, there may be provided a plurality of frames or supports. One of these frames is adapted to be fixedly carried by a tracer spindle having simultaneous feeding movement with the machine tool cutter. Another of these frames is supported so that it has limited rectilinear movement relative to the first-mentioned frame along a path in a fixed plane. The tracer finger (or tracer stem) is supported in the second frame so that it moves therewith along the latter's path of travel and has limited rectilinear movement relative to said second frame along a path in a fixed plane at right angles to the rectilinear path of travel of the second-mentioned frame. Therefore, the tracer finger may have lateral movement in any direction relative to the frame carried by the tracer spindle as well as relative to the pattern, such lateral movement being independent of and also not causing any longitudinal movement thereof. In all of such movements, the longitudinal axis of the tracer finger remains perpendicular to a given plane. The tracer finger may also be supported so that it has rectilinear longitudinal movement relative to the frames and to the pattern independently of the lateral movement heretofore described, thus creating a three-dimensional tracer.

The relative movements of the frames and tracer finger are utilized to operate electrical switches, pressure bellows, valves, carbon stacks, variable condensers, or other sensing devices. There may be a plurality of such sensing devices operated by the various movements, thus making the tracer adaptable to control a plurality of separate control systems which in the case of a machine tool, can in turn be utilized to control the relative movements of the work and the cutting tool. However, these separate control systems may also be used to control other devices than machine tools and the tracer mechanism herein described is not to be limited to such application.

The supports or connections for the frames and tracer finger constitute not only the means of guiding the frames in relative rectilinear movement without the use of frictionally coacting parts, but also constitute the means for restoring the frames after relative deflection to their normal positions. They may consist of flat pieces of resilient metal or other material having comparable required characteristics. It is important that a piece of material comprising an element of the support be secured to each of two frames so that as relative movement takes place between such frames, the piece is placed under tensile stress tending to elongate it, as well as under a bending force. This may be accomplished by a variety of ways. For example, the piece may be secured at spaced opposite portions thereof to one frame and at an intermediate portion thereof to the other frame. Another way consists of having two or more pieces of metal each having one portion secured to one frame and another secured to the other frame. The pieces are so arranged angularly with respect to each other that the forces transmitted by each are in equilibrium, and the relative movement of the frames is thereby constrained to rectilinear movement. In order to permit relative rectilinear motion and restrain other relative movement between a pair of frames, a pair of supports, properly spaced, may be utilized to connect a respective pair of frames. The action of a pair of spaced supports restrains the frames to relative movement in a rectilinear path in a given fixed plane and within the limits of elasticity of the metal pieces. As the metal pieces comprising the supports are placed under tensile and bending stress tending to elongate and bend them by the slightest relative movement of a pair of frames connected thereby, they restore quickly and accurately to their original or zero position when the displacing forces are removed. Consequently, a sensing device may be adjusted to operate on minute movements. In the embodiment hereinafter described, the moving parts of the tracer will return to within .0002 inch of their original null after deflection therefrom. Hence the operating pressures of the tracer are very slight, as the small amount of flexing necessary to operate the sensing devices does not require much pressure.

If desired, the tracer may be modified so as to be a two-dimensional control. In such case, the tracer finger is supported so that it does not have movement along a line perpendicular to the movement of the frames. In such modification the sensing devices operable by such movement may be omitted from the device.

In order to maintain accuracy of the tracer under severe working conditions, each frame is secured to the supports or connections at two or more spaced points. This prevents the frames from canting with respect to each other under heavy operational loads or severe vibration. However, this two point connection is not necessary to the successful operation of the tracer as single point connection has been found to operate satisfactorily in average working conditions.

Referring to the accompanying drawings forming a part hereof, Figure 1 is a view in perspective of a motion translating device embodying the invention, with the main elements disassembled and exploded along the longitudinal axis for clearness of illustration;

Figure 1:
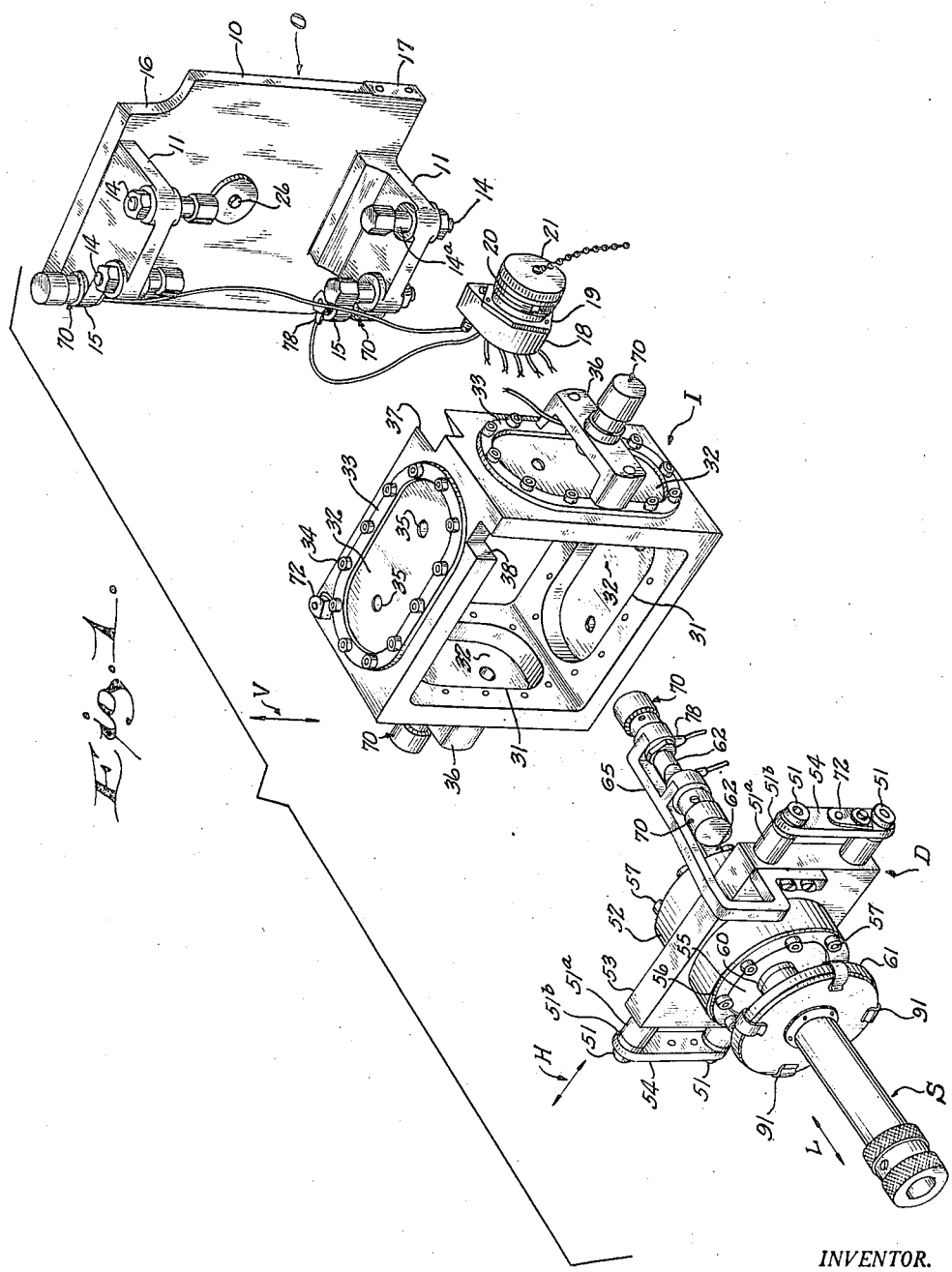
Figure 2:
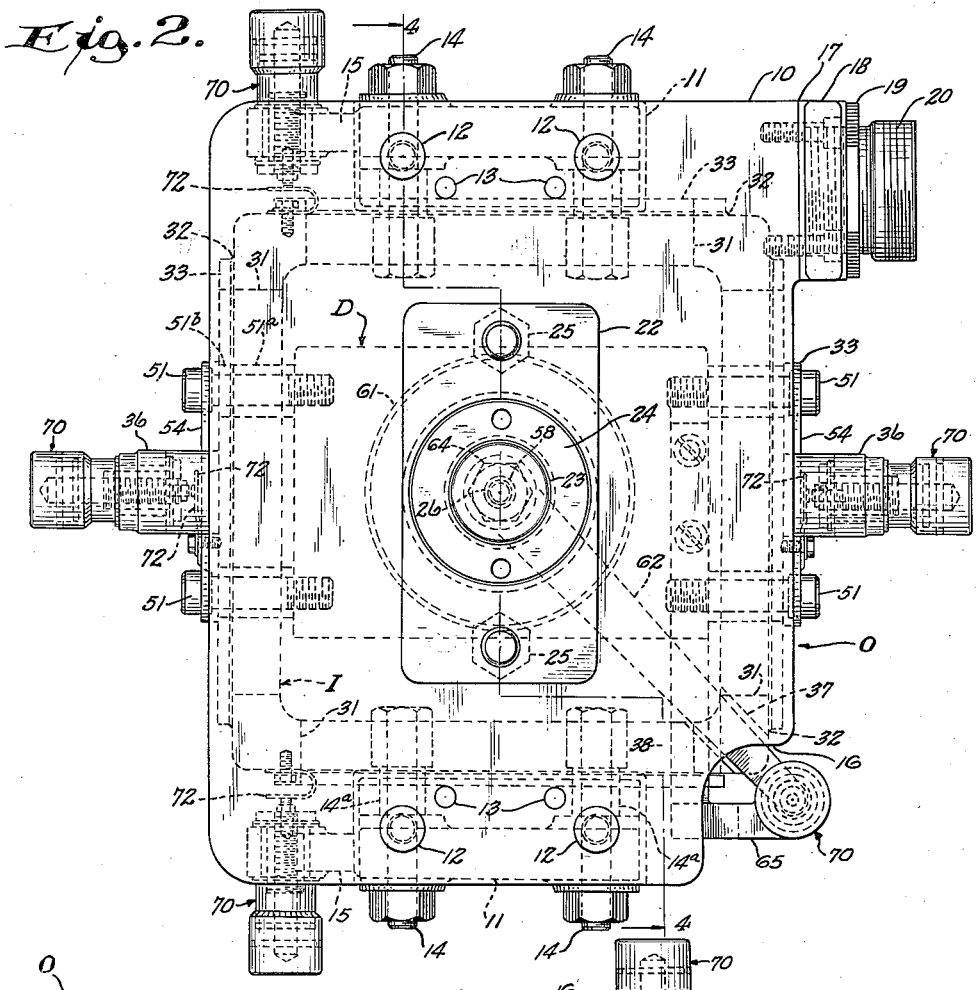
Figure 2 is a top plan view of the motion translating device viewed in Figure 1 with the main elements assembled in place.

Referring in greater detail to the drawings, the motion translating device disclosed in Figure 1 comprises three main elements. There is an outer frame or mounting support O, an intermediate frame or box I, and an inner frame or drum D. The latter frame caries a tracer stem S into which tracer fingers of various sizes and shapes are fitted. The intermediate frame or box I has limited rectilinear movement relative to the outer frame O in both directions along the line designated V shown in Figure 1. The inner frame or drum D is supported within the box I so that it has limited rectilinear motion relative to the box I in both directions along the line designated H. The rod 58 and the tracer stem S, together with any tracer finger mounted therein, have limited rectilinear movement relative to the drum D in both directions along the line designated L. Such relative movements of the parts are obtained without the use of any guiding means having sliding surfaces in contact by employing resilient metal connections as hereinafter described. Each of these separate and independent relative movements is utilized to make and break the electrical switches, as will be more fully pointed out.

The outer frame O may include a top plate 10 which has depending from opposite sides, respective box supporting brackets 11. The brackets 11 are identical in shape and construction except that one is left-hand and the other is right-hand. They are secured to the edges of the top plate 10 by a pair of headed screws 12 and a pair of dowel pins 13. The dowel pins positively anchor and properly align the brackets. Each bracket at its lower corner is provided with apertures to receive and hold a pair of bolts 14. Each of the brackets 11 has near its top a lateral projection 15 which supports a micrometer adjustable element 70. The projection 15 extends from the left side of one bracket and from the right side of the opposite bracket plate so that the micrometer adjustable elements are in substantial alignment. Each micrometer adjustable element is identical in structure and one will hereinafter be described in detail.

The top plate 10 has one corner notched as at 16, to accommodate the micrometer adjustable element 70 carried by the drum D. It also has on its edge a flat portion provided with two spaced threaded apertures, generally indicated at 17, to flatly receive and hold the electrical connector carrying bracket 18. A seven prong electrical connector 20 is threaded into the bracket 18 and locked by a lock nut 19. A protective cover 21 may be provided for the connector lock 20 to protect it from damage when the device is not in use. There are six micrometer adjustable elements all electrically insulated from the body of the device, and each of these elements is separately connected to a respective terminal (not shown) of the electrical connector. The seventh terminal of the electrical connector is electrically grounded to the device.

A coupling flange 22 is fastened to the top plate 10 by a bolt 23 having its head fitted within a recess in the under side of the top plate 10. A nut 24 threaded on the bolt 23 holds the flange rigidly in place. A pair of screws 25 rotatably carried in the flange 22 is utilized to secure the coupling flange 22 and with it the outer frame or mounting support O rigidly in place on a suitable support of a machine tool or other mechanism to be controlled.

A pair of threaded set screws 26 is threaded into the central portion of the bolt 23. One of these screws, in normal position, extends below the head of the bolt 23 to act as an abutment for the rod 58 to prevent undue flexure of the metal plates carried by the inner frame or drum D. Required adjustment of the lower of the two set screws 26 may be made by first removing the upper, then adjusting the lower, and then again inserting and tightening the upper against the lower.

Having particularly described the structure of the element O, the means by which it is connected to the intermediate frame I for relative movement therebetween will now be described. The opposite sides of the intermediate frame or box I are provided with identical oblong openings 31. Fastened in place over these openings are similarly-shaped flat resilient metal plates 32. The marginal edges of these plates overlap and rest flatly on the marginal edges of the openings 31. Clamping rings 33 rest flatly against the marginal edges of the metal plates 32 and tightly engage and clamp the plates 32 between themselves and the marginal surface around the openings 31. To effect this clamping action, a multiplicity of screws 34 positioned at regularly-spaced intervals around the ring 33 are utilized. Care is exercised in tightening the screws 34 in oppositely related pairs to insure that the metal plates 32 remain as flat as possible. Each of the plates 32 is provided with a pair of openings 35. The openings in one pair of oppositely related plates receive the bolts 14, while those of the other pair receive the screws 51. To connect the intermediate frame I to the outer frame O, the shanks of the bolts 14 are inserted through the openings 35 with their heads flush against the inner surface of the metal plates 32. Spacing members 14a are placed on the shanks of the bolts 14 between the plates 32 and box supporting brackets 11 to properly space the box I from the frame O. Whenever the box I is moved relative to the frame O in either direction along the line V the metal plates 32 are placed under stress tending to bend or deflect them, as well as elongate them. As these plates are secured at oppositely spaced portions to the marginal edges of the openings 31, any flexing of the unsupported body portion of the plates will place the metal of the plate under elongating tension as well as bending stress. In the preferred embodiment these plates are made of spring steel, and whenever so tensioned, they restore quickly and accurately to neutral untensed position when the deflecting force is removed. The use of a pair of spaced bolts 14 prevents angular or canting movement between the outer frame O and the intermediate frame I.

Figure 3:
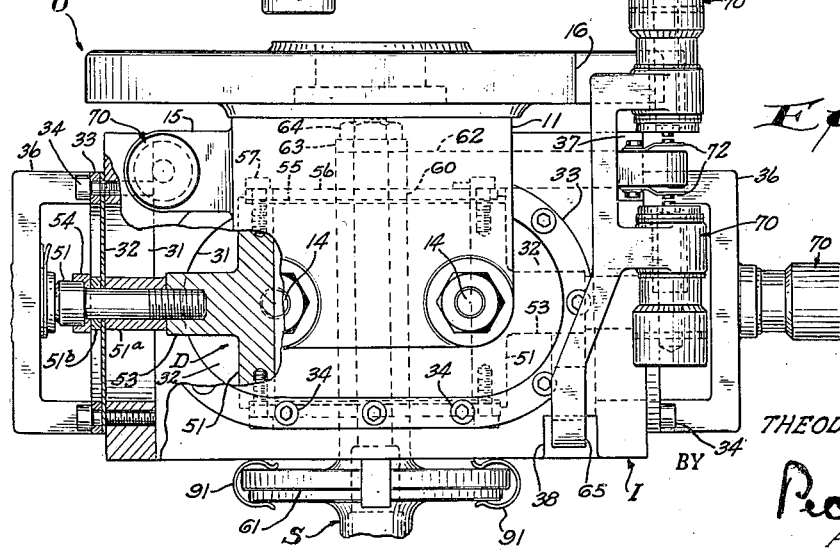
Figure 3 is a view in front elevation of the device illustrated in Figure 2, with some parts omitted and others broken away to more clearly show the structure of the inner frame or drum.

The inner drum D and its connection to the intermediate frame or box I will now be described. The inner frame or drum D comprises a hollow cylindrical body 52 which is open at the top and bottom. Intermediate the top and bottom of the drum there is provided a rectangularly shaped member 53 which provides the means for supporting the body 52 and connecting it to the metal plates 32 of the inner frame I. Such connection is made (see Figure 3) by providing a large spacer 51a between the edges of member 53 and the metal plates and a small spacer 51b (and the bar 54) between the metal plates 32 and the heads of screws 51. With the metal plates 32 so connected to the inner frame or drum D, relative movement of the drum with respect to the intermediate frame I in either direction along the line H stresses the plates 32 in the same way as described in the preceding paragraph.

The manner of movably securing the tracer stem for longitudinal movement relative to the drum D will now be described. Both ends of the cylindrically shaped body 52 are provided with flexible metal discs 55 of substantially the same material as the metal plates 32. The discs 55 are clamped in place by metal rings 56 in substantially the same manner as are the plates 32, screws 57 being used to hold the rings. These screws are also tightened in oppositely related pairs in order to maintain the metal discs 55 flat. Before the discs are secured in place, a spacer 59 is placed between them. A rod 58 passes through centrally located apertures in the discs 56 and also the spacer 59. The rod 58 has threaded ends extending outwardly of the metal discs 56. A washer 60 is slipped over each end of the rod and rests against the outer surface of the metal discs 55. The lower end of the rod 58 has threaded thereon a holding bracket 61, for the tracer stem S. A contact arm 62 is positioned over the upper end of the rod 58 and on top of it is placed a washer 63, while a nut 64 clamps the washer 63, the contact arm 62, the washers 60, the discs 55, and the spacer 59 tightly in place between itself and the holding bracket 61. Thus assembled, the holding bracket 61 has limited rectilinear movement relative to the inner frame or drum D in both directions along the line marked L. The discs 55 prevent any relative angular or canting movement between these parts and like the metal plates 32 are placed under stretching tension as well as bending tension when there is any relative movement between these parts. Thus the discs always tend to bring the bracket 61 to a neutral or normal position whenever deflecting force is removed.

As has been previously explained, there is limited relative rectilinear movement between the intermediate frame I and the outer frame O along one path, between the drum D and the intermediate frame I along another path, and between the bracket 61 and the drum D along a third path. These limited movements can be separately utilized to operate respective pairs of sensing devices. In this particular embodiment, such devices take the form of electrical switches; however, other types of sensing devices may be readily employed. The ground element of each switch is mounted on a spring member 72. The other contacting element of each switch is mounted on a micrometer adjustable element 70. The elements 70 are adjusted when the parts are in normal or neutral position. It has been found that operating gaps between each element of anywhere from .0005 inch to .002 inch, depending upon the operating speed of the machine to be controlled and the depth of the cut for which the machine is set are satisfactory. Such fine adjustment is readily accomplished by the micrometer adjustable elements 70, the structure and operation of which will be hereinafter described.

One pair of switches is operated by the relative movement between the outer frame O and the intermediate frame I. The members 72 of these switches are mounted on opposite sides of the intermediate frame I, while the elements 70 are positioned on the projection 15 forming part of the outer frame O. Only one of these switches can be engaged or in contact at a time. Another pair of switches is operated by the relative movement between drum D and the intermediate frame I. The members 72 of these switches are mounted on bars 54 which are carried by the screws 51 and are movable with the drum D, while the elements 70 are carried by bridges 36 mounted on the intermediate frame I. The bridges 36 have legs resting on the clamping rings 33 and the screws which hold the bridges in place also aid in holding the clamping rings. Only one of these pair of switches can be engaged at a time. A third pair of switches is operated by the relative movement between the bracket 61 and the drum D. The members 72 of these switches are mounted on the end of contact arm 62 and are movable with the bracket 61, while the elements 70 are carried by a bracket 65 mounted on the drum D. Only one of these pairs of switches can be engaged at the same time. For the purpose of conveniently locating this last pair of switches, the contact arm 62 extends through a notch 37 in one corner of the intermediate frame I to the exterior thereof, and the bracket 65 projects outwardly from the drum D through the notch 38 in the intermediate frame I and upwardly along the outside of said frame a distance sufficient to permit the micrometer adjustable holding element 70 and the contacts carried thereby to be positioned opposite the contacts carried on the arm 62.

Whenever outside deflecting force is placed on the tracer stem S in any direction, that force will divide into components along the lines V, H and L. If the component along the line V is sufficient to overcome the resilient force in the plates 32, one member 72 on the frame I will engage with the adjustable element 70 mounted on the outer frame O and an electrical circuit will be established. If the component along line H is sufficiently strong to overcome the resilient force in the other plates 32, then one member 72 on the drum D will engage with the adjustable element 70 mounted on the bridge 36. If the component along line L is strong enough to overcome the resilient force of discs 55, then one member 72 on the arm 62 will engage with the adjustable element 70 carried on the bracket 65. Whenever the force is lessened or removed, the inherent resiliency of the metal plates will move the frames to their neutral positions where none of the contact points will be in engagement.

Figure 4:
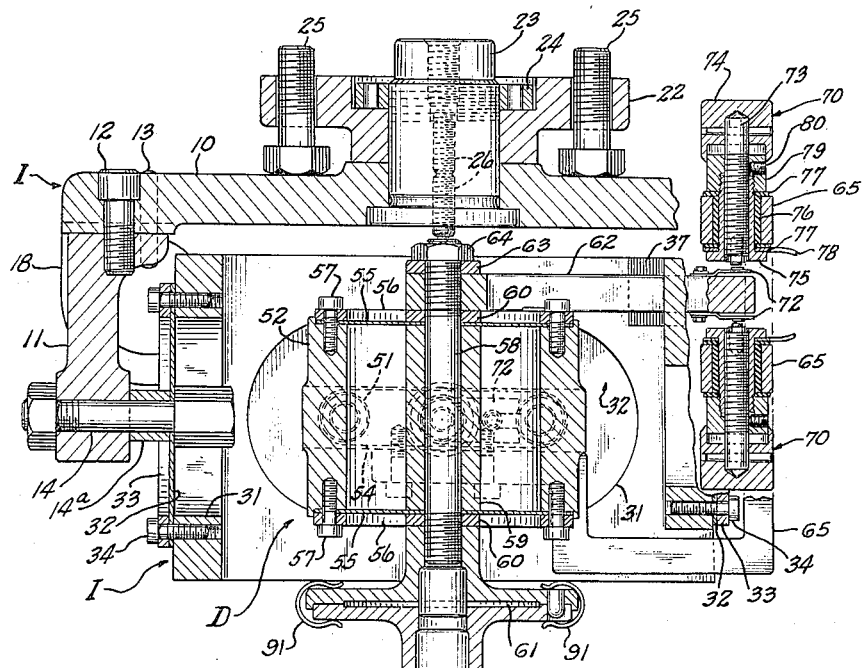
Figure 4 is a sectional view taken on the line 4—4 of Figure 2 with parts broken away to clarify the view and with the micrometer adjustable elements for a pair of switch contacts shown in longitudinal cross section.

The construction of the micrometer adjustable switch holding elements 70 is shown in detail in a cross-sectional view in Figure 4. As they are identical in construction, only one will be described and numbered. The contact point is secured in the end of a rod 73 which is threaded so as to have a pitch such that an advancement of .001 inch will be made upon turning the operating knob 74 from one graduation to an adjacent graduation marked on such knob relative to a fixed index line on the nut 79. The rod 73 is threadedly mounted in a bushing 75 which in turn is held within a Bakelite casing 76 to insulate the bushing. Insulating washers 77 are positioned between the headed end of the bushing 75 and a nut 79 threaded on the bushing 75. A metal terminal 78 surrounds the bushing 75 and is in electrical engagement therewith but otherwise insulated. In order to insure frictional contact between the rod 73 and the internally threaded bushing 75, a small set screw 80 is placed in the nut 79 and a small Bakelite plug rests under its end. The Bakelite plug grips the thread of the rod 73 and prevents it from turning under vibration. Each of the terminals 78 is separately connected by wire to a respective prong of the electrical connector 18. In Figure 1, only two such connections are shown complete, the others being broken away for the purpose of simplifying and clarifying the view.

One of the essential characteristics of the construction just described is the absence of any slidably engaging parts. The suspension between the intermediate frame and outer frame, and the inner drum and the intermediate frame, and the tracer holding stem and the drum is such that the movement between these various parts is restricted to rectilinear movement, and yet no part has a rubbing contact with the other. This is also true with respect to the contact points which are so mounted as to have movement toward and away from each other in a rectilinear path. The metal plates 32 and the discs 55 perform not only the function of guiding the relative movement of the parts as above described, but also cause these parts to assume a neutral or normal position whenever and deflecting pressure or force is removed. It will be noted that each plate or disc has opposite points of engagement with one of the relatively movable elements, and an intermediate point of engagement with the other of the relatively movable elements. Hence, whenever relative movement occurs, the plate or disc is not only deflected and bent, it is also elongated. It has been found that the double action thus set up in the metal makes it react quickly whenever pressure is removed and assume its neutral unstressed position to at least within .0002 of an inch. This accuracy and quickness of restoral permits the operating gap between the switch elements or the operating movement of any other sensing device substituted in lieu thereof to be kept at a minimum. This increases the sensitivity and accuracy of the device in its response to any minute changes in the pattern or other controlling element to which its tracer finger is applied. Also because of the smallness of the relative movement obtainable with this device, the amount of pressure needed to deflect the parts is low.

Because the relatively movable parts have rectilinear movement only, the tracer support S and any tracer finger fitted therein can move in all directions while maintaining its longitudinal axis perpendicular to a given fixed plane. Hence as the tracer finger is deflected a given amount, the resultant movement of the element of a switch or switches will be in direct one to one ratio. Therefore, tracer fingers of varying lengths can be used without changing the adjustments of the switches or lowering the accuracy and sensitivity of the device.

Figure 5:
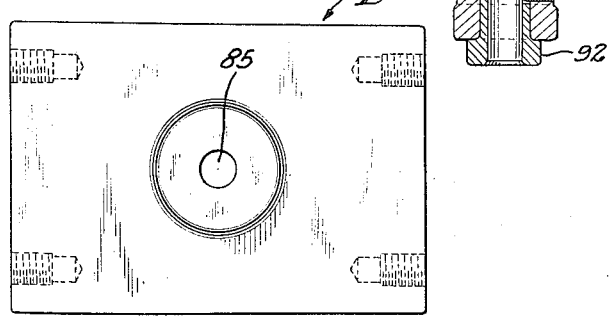
Figure 5 is a top plan view of the tracer box bridge used as an alternative for the inner frame hereinafter described and designated generally D.

In the event that it is only desired to utilize the motion translating device in connection with a pattern where the outline confirmation only is desired and not the third dimension or depth, the device may be locked by clamping the micrometer elements 70 against the contacting arm 62. The electrical circuits for these contacts is also broken. In the event the device is to be used for such two dimensional work constantly, it may be modified by substituting for the drum D the tracer box bridge B, shown in Figure 5. To make such substitution, it is only necessary to remove the nut 64 and withdraw the rod 58 and place it through the opening 85 in the bridge B. In making this change, the washers 60 are used but the contact arm 61 and washer 63 are omitted, as well as the bracket 65 and its associated micrometer adjustment elements 70.

The tracer stem S has an upper disc which fits within a complementary formed disc on the holding bracket 61. A dowel pin is utilized to align these parts in the same position each time they are assembled. A plurality of clip springs 91 hold the peripheral edges of the two discs together under normal operation conditions. If an unusual or unexpected force is placed on the tracer finger, and hence through the tracer stem S, the springs 91 will part and break the connection between the tracer stem S and the holding bracket 51, thereby preventing injury to the device and its metal holding plates.

It is understood that the tracer stem S is designed as is well known in the art to receive tracer fingers of varying size, length, and shape. As shown in Figure 4, it accommodates two standard size necks. The tracer finger, in the usual operation of the device, has the same shape as the cutting tool on the machine. A removable adapter 92 is fittable in the lower end of the tracer stem S and can be removed when tracer fingers with larger shanks are to be used with the device.

One of the many applications for the device is in connection with the controlling of an operation of a machine tool of the type where the work is moved in and out and right and left with respect to the cutting tool while the cutting tool may be moved up and down with respect to the work. In this particular type of installation, the circuit which controls the up and down movement of the cutting tool would be controlled by the two switches carried by the inner frame D. The right and left movement of the work would normally be controlled by the electrical circuit operated by the switches carried on the bridges 36 and operated by a rectilinear movement of the inner frame D with respect to the intermediate frame I along the line H. The in and out movement of the work would normally be controlled by the electrical circuit operated by the electrical switches carried on the outer frame O and operated by the relative movement of the intermediate frame I with respect thereto along the line V. If a deflecting pressure were placed on the tracer finger and hence through it to the tracer stem S in any direction not parallel to any of the lines of motion L, H and V, such deflecting force, as heretofore explained, would be converted into three components, one of which would be parallel to a respective one of the three lines of motion L, H and V. Depending upon the angularity and the amount of the pressure, such components would be sufficient to cause from one to three contacts to be made. However, oppositely related contacts would never become actively engaged simultaneously. Thus, it would be possible to have an inward movement, a movement to the right, and an upward movement, all taking place at the same time for the same length of time or for varying intervals. Other combinations, of course, are possible.

Although only one embodiment of the invention is shown and described herein, it will be understood that this application is intended to cover such changes or modifications as come within the spirit of the invention or scope of the following claims:

1. In a tracer, a frame member, four resilient metal plates having their peripheries secured to said member in such a manner as to permit their body portions to flex within the elastic limits of the metal, said plates arranged in spaced parallel pairs angularly positioned at 90° apart, a supporting member secured to the body portion of one pair of plates, a tracer finger carried by the body portion of the other pair of plates with its longitudinal axis parallel to the planes of said plates whereby said tracer finger is supported for lateral movement relative to said supporting member while maintaining its longitudinal axis perpendicular to a given plane and independently of any longitudinal movement, and means associated with said finger, frame and supporting member to operate control mechanism as said finger is moved laterally by pressure from a pattern.

2. In a tracer, a frame member, four resilient metal plates having their peripheries secured to said frame member in such a manner as to permit their body portions to flex within the elastic limits of the metal, said plates arranged in spaced parallel pairs angularly positioned at 90° apart, a supporting member secured to the body portion of one pair of plates, an inner frame member positioned interiorly of said frame member, said inner frame member secured to the body portion of the other pair of plates, a pair of spaced parallel metal plates carried by said inner frame having their perimeters engaged thereby and their body portions free to flex within the elastic limits of the metal, a tracer finger secured to the body portions of said last-mentioned plates whereby said tracer finger is supported for lateral movement while maintaining its longitudinal axis perpendicular to a given plane and independently of any longitudinal movement and for longitudinal movement independently of any lateral movement, and means associated with said finger, inner frame, frame and supporting member to operate control mechanism as said finger is moved laterally and longitudinally by pressure from a pattern.

3. In a tracer, a support member having dependent oppositely positioned brackets, a drum support positioned between said brackets, a pair of resilient metal plates having their edges secured to said drum support with their body portions free to flex, rigid connections between said body portion and said depending brackets to hold said drum support for rectilinear motion with respect to said support, said plates acting to restore said drum support to its initial position whenever deflecting pressures have been removed, a drum positioned within said drum support, an additional pair of resilient metal plates having their edges secured to said drum support and their body portions free to flex, rigid attachments between said drum and said plates whereby said drum has rectilinear motion with respect to said drum support, a stem for rigidly holding a tracer finger having a portion inserted within said drum, a pair of resilient metal plates having their edges secured to said drum and their body portions secured to said stem whereby said stem has longitudinal motion with respect to said drum along a path parallel to the planes of the metal plates carried by said drum support, a pair of sensing devices carried by said support member and said drum support and alternately operable upon rectilinear movement of said drum support with respect to said support member, another pair of sensing devices carried by said drum support and said drum and alternately operable upon rectilinear movement of said drum relative to said drum support, and a final pair of sensing devices carried by said drum support and said stem and alternately operable upon longitudinal movement of said stem relative to said drum support.

4. In a tracer, a mounting frame, an intermediate frame and a tracer support frame, a tracer finger carried by said latter frame, a pair of spaced parallel flat resilient members having portions connected to said tracer support frame and to said intermediate frame to restrain said tracer support and said intermediate frames to relative rectilinear movement, another pair of spaced parallel flat resilient members having portions connected to said intermediate frame and to said mounting frame to constrain said intermediate frame and said mounting support frame to relative rectilinear movement, a pair of alternately operable sensing devices including an operating element carried by said intermediate frame, and a second pair of alternately operable sensing devices including an operating element carried by said intermediate frame, said resilient members operable to restore said frames to initial normal relative position with said operating elements in neutral position.

5. In a tracer, a mounting frame, an intermediate frame, a tracer support frame, and a tracer finger carried by said latter frame, a pair of spaced parallel flat resilient members having portions connected to said tracer finger and said tracer support frame to restrain said finger and said tracer support frame to relative rectilinear movement, another pair of spaced parallel flat resilient members having portions connected to said tracer support frame and to said intermediate frame to restrain said tracer support and said intermediate frames to relative rectilinear movement, a third pair of spaced parallel flat resilient members having portions connected to said intermediate frame and to said mounting frame to constrain said intermediate frame and said mounting support frame to relative rectilinear movement, a pair of alternately operable sensing devices including an operating element carried by said tracer finger, another pair of alternately operable sensing devices including an operating element carried by said tracer support frame, and a third pair of alternately operable sensing devices including an operating element carried by said intermediate frame, said resilient members operable to restore said frames and finger to initial normal relative position with said operating elements in neutral position.

6. In a tracer, in combination, a supporting base, a frame, a mounting structure supporting said frame on said base for and constraining said frame to rectilinear movements in opposite directions along a straight line path in a given plane, a tracer stem support, a mounting structure supporting said stem support on said frame for and constraining said support to rectilinear movements in opposite directions in said given plane along a straight line path at right angles to the straight line path of movement of said frame, a tracer stem, a mounting structure supporting said tracer stem in laterally fixed position on said stem support with its longitudinal axis perpendicular to said given plane of rectilinear movements of said stem support and frame, said tracer stem mounting structure supporting said stem for longitudinal movements independently of said stem support in opposite directions along a straight line path perpendicular to said given plane by longitudinally acting pressures applied to said stem, said tracer stem being universally laterally movable independently of longitudinal movements thereof by the independent and compound rectilinear movements of said stem support and said frame resulting from application of lateral deflecting pressures to said tracer stem, and a plurality of sensing devices selectively operable by and in accordance with the directions of lateral and longitudinal movements of said tracer stem.

7. In a tracer, a pair of frames supported for relative rectilinear movement from an initial position thereof in opposite directions along straight line paths, a pair of alternately operable sensing devices, an operating element carried by one of said frames for movement thereby to operate either one of said pair of sensing devices in accordance with the direction of movement of such frame along its straight line path, said operating element being mounted on said frame for location of said element in inoperative position relative to said sensing devices with such frame in its initial position, the means for supporting said frames comprising a plurality of flat pieces of resilient material, said pieces having spaced portions secured to one of said frames and an intermediate portion secured to the other of said frames whereby relative movement of said frames places said pieces under stress, said pieces continually acting to urge said frames to their initial position with said operating element in inoperative position relative to said sensing devices.

8. In a tracer, a pair of frames supported for relative rectilinear movement from an initial position thereof in opposite directions along straight line paths, a pair of alternately operable sensing devices, an operating element actuated by movement of one of said frames to operate either of said sensing devices in accordance with the direction of movement of such frame along its straight line path, said operating element being maintained in inactive position relative to said sensing devices by such frame when in its initial position, the means for supporting said frames comprising a plurality of normally unstressed flat pieces of resilient material, said pieces having spaced portions secured to one of said frames and an intermediate portion secured to the other of said frames whereby relative movement of said frames places said pieces under tensile stress causing the same to flex and constrain said frames to straight line movements, and said resilient pieces acting to restore said frames to initial position and said operating element to inactive position relative to said sensing devices upon the removal of stressing forces therefrom.

9. In a tracer, in combination, a base, a frame, a mounting structure supporting said frame on said base for and constraining said frame to rectilinear movements in opposite directions along a straight line path in a given plane, sensing devices alternately operable by movements of said frame in opposite directions, respectively, a tracer stem support, a mounting structure supporting said stem support on said frame for and constraining said support to rectilinear movements in opposite directions along a straight line path at right angles to the straight line path of movement of said frame, sensing devices alternately operable by movements of said stem support in opposite directions, respectively, along its straight line path, a tracer stem, a mounting structure supporting said tracer stem in laterally fixed position on said stem support with its longitudinal axis perpendicular to said given plane of rectilinear movements of said stem support and frame, said tracer stem mounting structure supporting said tracer stem for longitudinal movements thereof independently of said stem support in opposite directions along a straight line path perpendicular to said given plane, sensing devices alternately operable by longitudinal movements of said stem in opposite directions, respectively, along its straight line path, and said tracer stem being universally laterally movable by the independent and compound rectilinear movements of said stem support and frame resulting from the application of lateral deflecting pressures to said tracer stem.

10. In a tracer, in combination, a supporting base, a frame, resilient means movably supporting said frame from said base for and constraining such structure to rectilinear movements in opposite directions along a straight line path in a given plane, said resilient means being formed to be stressed by pressures applied to said structure acting to deflect the same along said path and to restore said frame structure to its initial position relative to said base when unstressed, a tracer stem support, resilient means movably mounting said support on said frame for and constraining said support to rectilinear movements in said given plane in opposite directions along a straight line path at right angles to the path of movement of said frame structure, said resilient means for said stem support being formed to be stressed by pressures applied to said support acting to deflect the same along said path of movement and to restore said support to its initial position relative to said frame when unstressed, a tracer stem, resilient means mounting said stem on said support in laterally fixed position with its longitudinal axis perpendicular to said given plane of rectilinear movements of said support and frame, said tracer stem resilient means supporting said stem for and constraining the same to longitudinal movements in opposite directions along a straight line path perpendicular to said given plane, said resilient means for said stem formed to be stressed by pressures applied axially of said stem acting to move the stem longitudinally and to restore said stem to its initial position when unstressed, the resilient means for said tracer stem being arranged to mount said stem for longitudinal movement independently of said frame and said stem support, the resilient mounting means for said frame and for said stem support being relatively arranged for straight line rectilinear movements of said frame and said support independently of each other, and for simultaneous compound movements thereof, said tracer stem being universally laterally movable by the independent and compound rectilinear movements of said stem support and frame resulting from the application of lateral deflecting pressures on said tracer stem, and sensing devices selectively operable by and in accordance with the direction of lateral and longitudinal movements, respectively of said tracer stem.

11. In a tracer, in combination, a supporting base, a frame, a pair of normally unstressed, spaced and parallel resilient plate members mounted for flexing when stressed in directions perpendicular to the planes of said members, said frame supported by said plate members from said base for and constrained by said members to rectilinear movements relative to said base in opposite directions along a straight line path perpendicular to the planes of said members, a tracer stem support, a second pair of normally unstressed, spaced and parallel resilient plate members mounted for flexing when stressed in directions perpendicular to the planes of said members, said second pair of plate members being mounted in parallel planes perpendicular to the planes of said first pair of plate members, said stem support connected to and supported by said second pair of plate members for and being constrained thereby to rectilinear movements relative to said frame in opposite directions along a straight line path at right angles to the straight line path of movement of said frame, a tracer stem, a third pair of normally unstressed, spaced and parallel resilient plate members mounted on said stem support disposed in parallel planes perpendicular to the planes of said first and second mentioned pairs of plate members, said tracer stem being connected to and supported by said third pair of plate members in laterally fixed position on said stem support for and constrained by said plates to longitudinal movements in opposite directions along a straight line path perpendicular to the plane of rectilinear movements of said frame and said stem support, said tracer stem being universally laterally movable with its axis maintained perpendicular to the plane of rectilinear movements of said frame and support by the independent and compound rectilinear movements of said frame and support resulting from application of lateral deflecting pressures to said tracer stem, and a plurality of sensing devices selectively operable, respectively, by the lateral movements and the longitudinal movements of said tracer stem.

12. In a tracer having frames supported for relative rectilinear motion for the purposes of operating sensing devices, means for supporting said frames and urging them to initial relative position comprising a pair of parallel spaced metal plates, each plate having its periphery clamped to one of said frames and its body portion unsupported by said frame, said other frame being mounted in position extended between said plates, and each of said plates having its body rigidly secured at two spaced points to adjacent structure of said other frame.

13. In a tracer, a pair of frames mounted and supported for and constrained to relative rectilinear motion along a straight line path to alternately operate a pair of sensing devices, said sensing devices comprising electric switches, one contact of which is adjustably mounted in position on and carried by one frame for rectilinear motion along a straight line path parallel with the path of movement of said frame and the other contact of which is mounted on a spring member carried by the other frame.

THEODORE MILLER.

REFERENCES CITED

The following references are of record in the file of this patent:

UNITED STATES PATENTS

| Number | Name | Date |
|---|---|---|
| 466,275 | Fasoldt | Dec. 29, 1891 |
| 1,014,012 | Lyon | Jan. 9, 1912 |
| 1,625,149 | Petnel | Apr. 19, 1927 |
| 2,007,899 | Shaw | July 9, 1935 |
| 2,013,676 | Stewart | Sept. 10, 1935 |
| 2,025,748 | Howe | Dec. 31, 1935 |
| 2,210,970 | Bonell | Aug. 13, 1940 |
| 2,229,352 | Thannhauser | Jan. 21, 1941 |
| 2,263,110 | Turchan #1 | Nov. 18, 1941 |
| 2,322,653 | Mitchell | June 22, 1943 |
| 2,331,817 | Turchan #2 | Oct. 12, 1943 |
| 2,409,903 | Schwartz | Oct. 22, 1946 |
| 2,447,201 | Miller | Aug. 17, 1948 |